(12) United States Patent
Sato

(10) Patent No.: US 6,371,395 B2
(45) Date of Patent: Apr. 16, 2002

(54) BAIL TRIPPING DEVICE FOR SPINNING REEL

(75) Inventor: Jun Sato, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/840,100

(22) Filed: Apr. 24, 2001

(30) Foreign Application Priority Data

Apr. 25, 2000 (JP) ......................................... 2000-124167

(51) Int. Cl.⁷ .............................................. A01K 89/01
(52) U.S. Cl. ....................................................... 242/232
(58) Field of Search ................... 242/232, 231, 242/230, 233

(56) References Cited

U.S. PATENT DOCUMENTS

| | | | | |
|---|---|---|---|---|
| 4,337,905 A | * | 7/1982 | Sazaki | 242/232 |
| 4,403,750 A | * | 9/1983 | Morimoto | 242/232 |
| 5,098,031 A | * | 3/1992 | Hitomi | 242/233 |
| 5,273,233 A | * | 12/1993 | Sugawara | 242/232 |
| 5,333,811 A | * | 8/1994 | Hitomi | 242/232 |
| 5,540,396 A | * | 7/1996 | Zanon | 242/232 |
| 5,613,644 A | * | 3/1997 | Karlsson | 242/232 |
| 5,667,159 A | * | 9/1997 | Carpenter et al. | 242/232 |
| 5,683,049 A | * | 11/1997 | Kawabe et al. | 242/232 |
| 5,820,052 A | * | 10/1998 | Yamaguchi et al. | 242/232 |
| 5,904,309 A | * | 5/1999 | Takeuchi | 242/232 |

FOREIGN PATENT DOCUMENTS

GB 2257004 * 1/1993 ................. 242/232

* cited by examiner

*Primary Examiner*—Emmanuel M. Marcelo
(74) *Attorney, Agent, or Firm*—Shinjyu Global IP Counselors, LLP

(57) ABSTRACT

Bail tripping device, for stably braking spinning reel rotors regardless of fluctuations in the shifting of the shifting member. The bail tripping device (18) returns the bail arm (17) from its line-releasing posture to the line-winding posture in cooperation with the rotor (3) rotating in the line-winding direction, and includes a shifting mechanism, a switching member (52), and a braking member (65). The shifting mechanism includes a shifting member (51) that is provided in the rotor and shifts, when the bail arm pivots, between a first position a second position, the shifting member having a first end turnably interlocked with the bail arm in a position neighboring its pivotal center, and a second end that protrudes toward a front portion of the reel body facing the rotor when the shifting member is in the second position. When the rotor rotates in line-winding direction, the switching member contacts the second end of the shifting member and shifts the shifting member toward the first position. The braking member is arranged at the front of the reel body, and the protruding second end of the shifting member in the second position can contact its peripheral surface.

7 Claims, 7 Drawing Sheets

BAIL TRIPPING DEVICE FOR SPINNING REEL

BACKGROUND OF THE INVENTION

1. Technical Field

The present invention relates to bail tripping devices; more particularly, to spinning reel bail tripping devices for returning the bail arm—fitted to allow for pivoting between line-winding and line-releasing positions, on the rotor mounted rotatively to the reel body of spinning reels—from the line-releasing position to the line-winding position in cooperation with rotor rotation in the line-winding direction.

2. Description of Related Art

In general, spinning reel rotors are equipped with a bail arm for guiding fishing line to the spool. The bail arm can assume a line-winding position, in which the fishing line is circumferentially guided onto the spool when the fishing line is being taken up, and a line-releasing position, in which the bail arm is flipped over from the line-winding position so that it does not get in the way when the fishing line is reeled out from the spool. The rotor is provided with a bail tripping device, which sustains the bail arm in the line-winding position and the line-releasing position, and restores the bail arm from the line-releasing position to the line-winding position in cooperation with rotor rotation in the line-winding direction.

As a conventional bail tripping device, the device disclosed in Japanese Laid-Open Pat. App. No. 10-4839 is known. This device includes: a toggle spring, fitted to the rotor, whose tip is interlocked with the bail arm in vicinity of its pivotal center; a shifting member the tip of which is interlocked with the bail arm in the vicinity of its pivotal center, and the base end of which shifts back and forth in the reel body orientation; and a switching protrusion furnished on the reel body for contact with the shifting member. The toggle spring toggles the bail arm between and urges it into two positions, and retains the bail arm in the two positions. When the bail arm is pivoted into the line-releasing position, the shifting member retreats into a position in contact with the switching protrusion. Then, when the rotor rotates in the line-winding direction, the shifting member comes into contact with the switching protrusion and is advanced: the toggle spring contracts due to the advancement, and the bail arm is returned into the line-winding position by the toggle spring.

When fishing line is reeled out by casting a spinning reel thus, reverse rotation of the rotor is blocked; and after catching the fishing line with the thick of the index finger, the bail arm is tripped into the line-releasing position. At this time the rotor is turned to bring the line roller at the one junction of the bail arm and the bail up toward the fishing rod, to make it easy to catch the fishing line with the finger. Then, in the course of flinging down the fishing rod, the index finger is released from the fishing line, and the tackle's arrival on the water is awaited. After the tackle has hit the water and the tackle has submerged suitably, the handle is reeled slightly and the bail tripping mechanism returns the bail arm into the line-winding position.

When fishing line reels out following a cast or under the weight of the tackle during trolling, an operation known as "feathering" is carried to keep the line from getting out of control: after the bail arm has been tripped into the line-releasing position, the leading rim of the spool is pressed with the tip of the index finger, and the thick of the index finger is brought into contact with the fishing line. At the time, the rotor is turned into a position in which the bail arm does not get in the way.

With conventional spinning reels, when the bail arm is in the line-releasing position if counter-rotation is blocked by a counter-rotation check mechanism, the rotor will not rotate in the line reel-out direction. Nevertheless, sometimes the rotor turns in the line reel-in direction. Lately in order to achieve high take-up efficiency the rotational balance of rotors has been improved, which has made them light and made them spin easily. Therefore, in spinning reels having improved rotational balance rotation briefly in the line-winding direction is likely. When the rotor turns, though the rotor has been turned into rotational phases suitable for casting or feathering respectively, the rotor rotational phase is liable to deviate.

In order to prevent this, in conventional configurations a braking member that comes into contact with the reel body and brakes the rotor is fitted to the shifting member. When the shifting member shifts into contact position, the braking member comes into contact with the front surface of the reel body and is compressed, braking the rotor. Thus elastically braking the rotor when the bail is tripped prevents the rotor from turning, and meanwhile the rotor can be turned in the line-winding direction as needed.

In the foregoing conventional configuration, the shifting-member-attached braking member coming into contact with the reel body and being compressed brakes the rotor. Therefore, the amount by which the braking member is compressed fluctuates with front-rear variation in the shifting member contact position due to manufacturing tolerances or margin of error in attachment. Fluctuations in the amount of compression vary the braking force on the rotor, such that the rotor is not stably braked.

SUMMARY OF THE INVENTION

An object of the present invention is, in a spinning reel bail tripping device wherein the rotor when in the line-releasing position is brakable, to enable the rotor to be braked stably regardless of fluctuations in the amount by which the shifting member shifts.

According to a first aspect of the present invention, a spinning reel bail tripping device for returning a bail arm, which can be pivoted between a line-winding position and a line-releasing position and is attached to a rotor mounted rotatively to a reel body of a spinning reel, from the line-releasing position to the line-winding position when the rotor rotates in line-winding direction, includes a shifting mechanism, a switching member, and a braking member. The shifting mechanism includes a shifting member that is provided in the rotor and shifts, when the bail arm pivots, between a first position corresponding to the line-winding position and a second position corresponding to the line-releasing position, the shifting member having a first end which rotatively engages with a position near the pivot center of the bail arm, and a second end that protrudes toward a front portion of the reel body facing the rotor when the shifting member is in the second position. The switching member is arranged at the front of the reel body, and, when the rotor rotates in line-winding direction, the switching member contacts the protruding second end of the shifting member in the second position, shifting the shifting member toward the first position. The braking member is arranged at the front of the reel body, and has a braking surface provided with an even peripheral surface over at least a portion of its circumference, wherein the protruding second end of the shifting member in the second position can contact the braking surface.

When the bail arm is tripped with this bail tripping device from the line-winding position to the line-releasing position, the second end of the shifting member contacts the front surface of the braking member and then shifts into the second position while contacting the even braking surface provided on the periphery of the braking member. As a result, the rotor is braked. In this braking state, the second end of the shifting member contacts the braking surface provided on the peripheral surface of a braking member, so that when the position of the shifting member shifts (that is, when the second position shifts), the second end of the shifting member still contacts the braking member. Therefore, the rotor can be braked gently, regardless of the shifting of the shifting member.

According to a second aspect of the present invention, in a spinning reel bail tripping device as in the first aspect, the first end of the shifting member is bent toward a vicinity of the pivoting center of the bail arm so as to be oriented substantially in parallel to the pivot axis, the second end is bent toward a rotation axis of the rotor, and between the first end and the second end, the shifting member is arranged substantially in parallel to a rotation axis of the rotor. The first end is rotatively engaged with the bail arm, and the second end is shiftably engaged with the rotor. With this configuration, when the bail arm pivots, the first end of the shifting member, which is oriented substantially in parallel to the pivot axis and engaged with the bail arm, swings around the pivot axis. Thus, the second end of the pivot member, which is engaged with the rotor and points toward the rotation axis of the rotor, shifts horizontally. By engaging the hook-shaped first end of the shifting member with the bail arm and engaging the second end shiftably with the rotor, the pivoting motion of the bail arm can be converted in a straightforward manner to a linear horizontal motion of the second end of the shifting member.

According to a third aspect of the present invention, in a spinning reel bail tripping device as in the first or second aspect, an end surface of the second end of the shifting member is rounded. With this configuration, the end surface of the shifting member that contacts the braking member is rounded, so that the shifting member can be shifted smoothly while contacting the braking member.

According to a fourth aspect of the present invention, in a spinning reel bail tripping device as in any of the first to third aspects, the shifting mechanism includes a toggle spring mechanism, one end of which engages rotatively with the bail arm, the toggle spring mechanism toggling and biasing the bail arm into the line-winding position and the line-releasing position. With this configuration, the bail arm can be held reliably in the two positions.

According to a fifth aspect of the present invention, in a spinning reel bail tripping device as in any of the first to fourth aspects, the switching member has a first oblique surface whose leading side with respect to a line-winding rotation of the rotor protrudes further from the front of the reel body towards the rotor than its trailing side. With this configuration, when the rotor starts to rotate in the line-winding direction, the shifting member contacts the first oblique surface of the switching member and is gradually pushed toward the rotor, returning the bail arm to the line-winding position. Thus, the bail arm can be smoothly restored to the line-winding position by the first oblique surface.

According to a sixth aspect of the present invention, in a spinning reel bail tripping device as in the fifth aspect, the switching member further has a second oblique surface, formed in continuation with the protruding portion of the first oblique surface, the second oblique surface receding from the protruding portion of the first oblique surface towards the leading side with respect to the line-winding rotation of the rotor. With this configuration, a second oblique surface is provided, arranged at an angle to the first oblique surface. By forming this second oblique surface, when the rotor is rotated in the direction rolling off line and the shifting member contacts the switching member, the shifting member is smoothly guided by the second oblique surface, and is less easily damaged.

According to a seventh aspect of the present invention, in a spinning reel bail tripping device as in any of the first to sixth aspects, the braking member is a substantially annular elastic member with a rectangular cross section, that can be contacted by the shifting member and is provided at the front of the reel body. With this configuration, it is possible to extend the range of rotational orientations in which the rotor can be braked.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
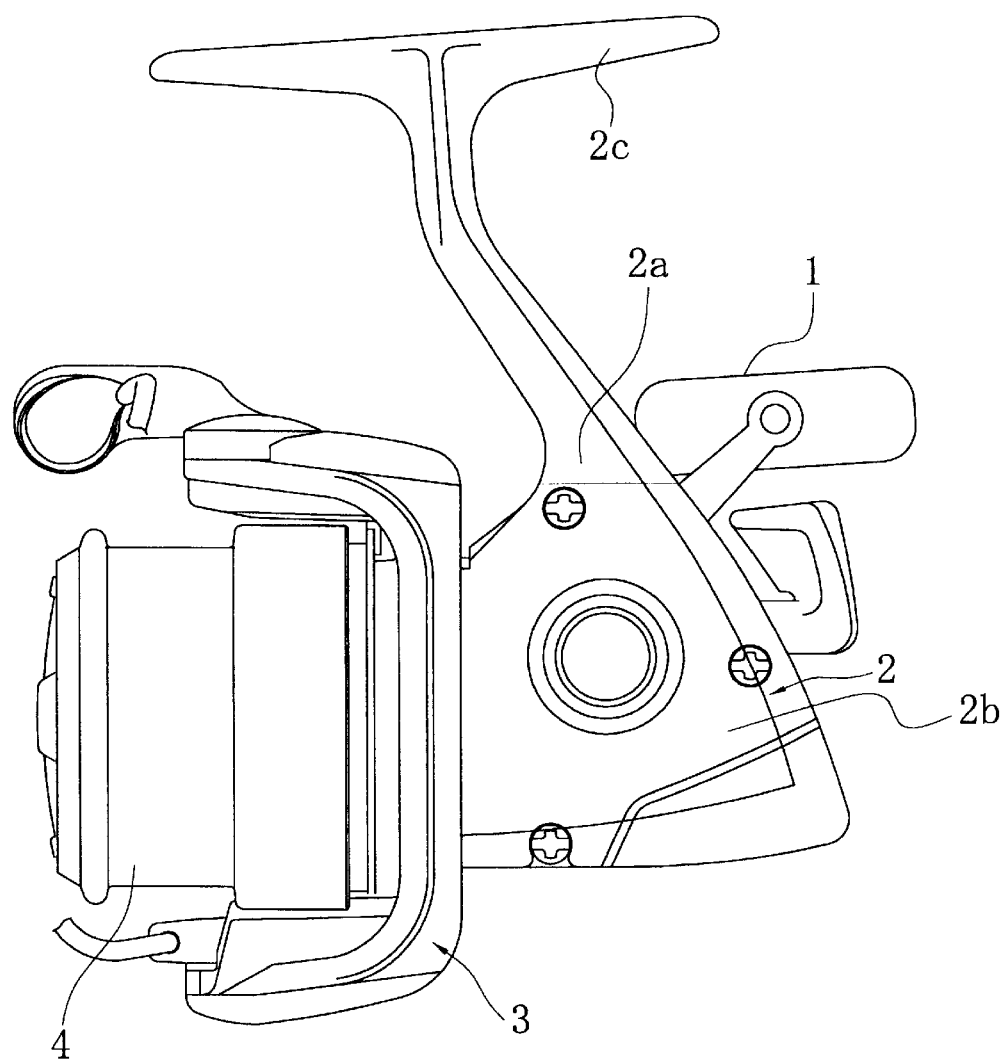
FIG. 1 is a left-side view of a spinning reel in which one embodiment of the present invention is adopted.

As shown in FIG. 1, a spinning reel in accordance with an embodiment of the present invention includes a handle 1, a reel body 2 rotatively supporting the handle 1, a rotor 3, and a spool 4. The rotor 3 is rotatively supported at the front of the reel body 2. The fishing line is wound around the outer peripheral surface of the spool 4, which is disposed at the front of the rotor 3 and can be shifted back and forth.

The reel body 2 includes a reel body 2a provided with a space inside and a lid member 2b mounted detachably to the reel body 2a, shutting the space in the reel body 2a.

Figure 2:
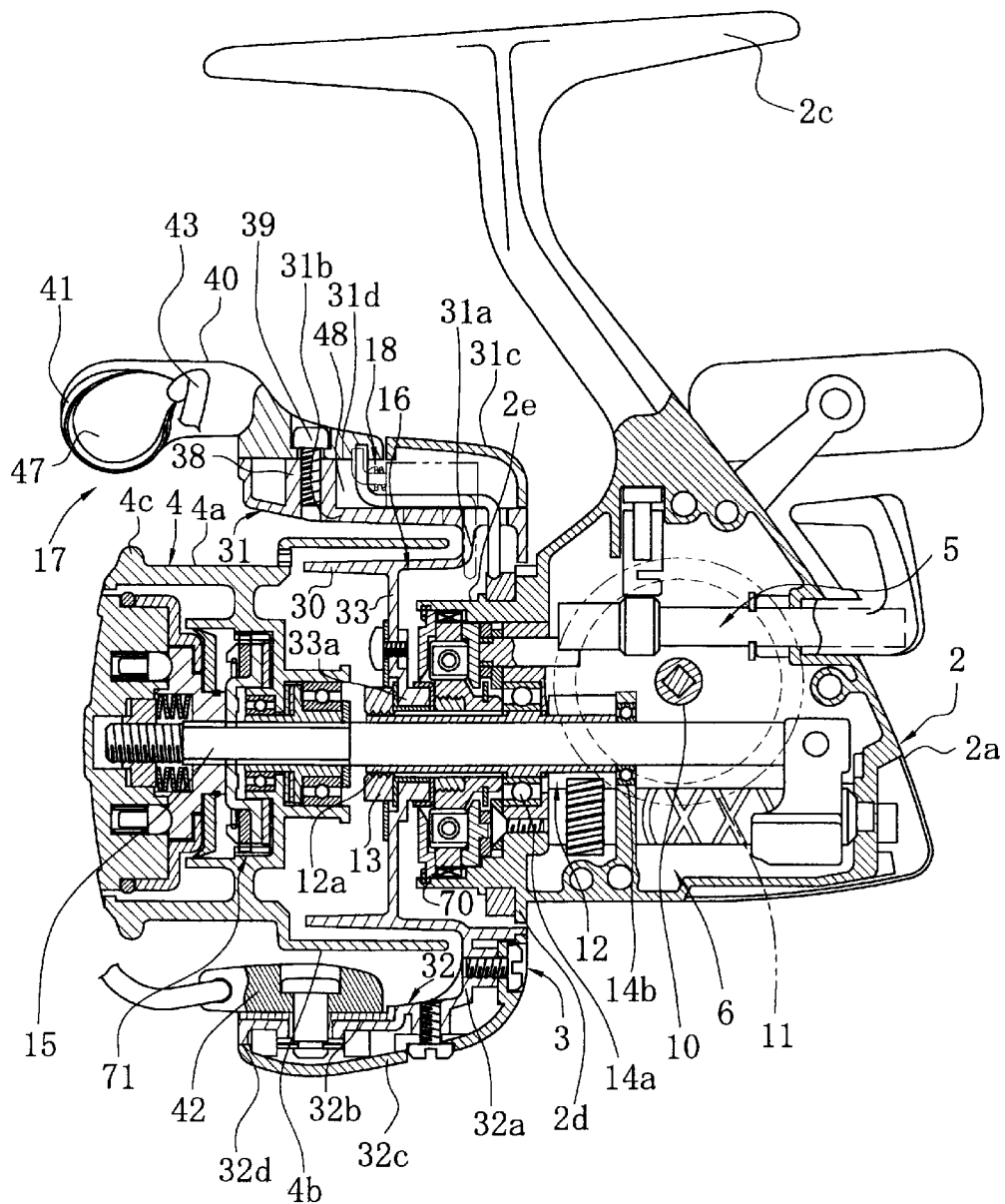
FIG. 2 is a partly in sectional view of the FIG. 1 spinning reel.
Figure 5:
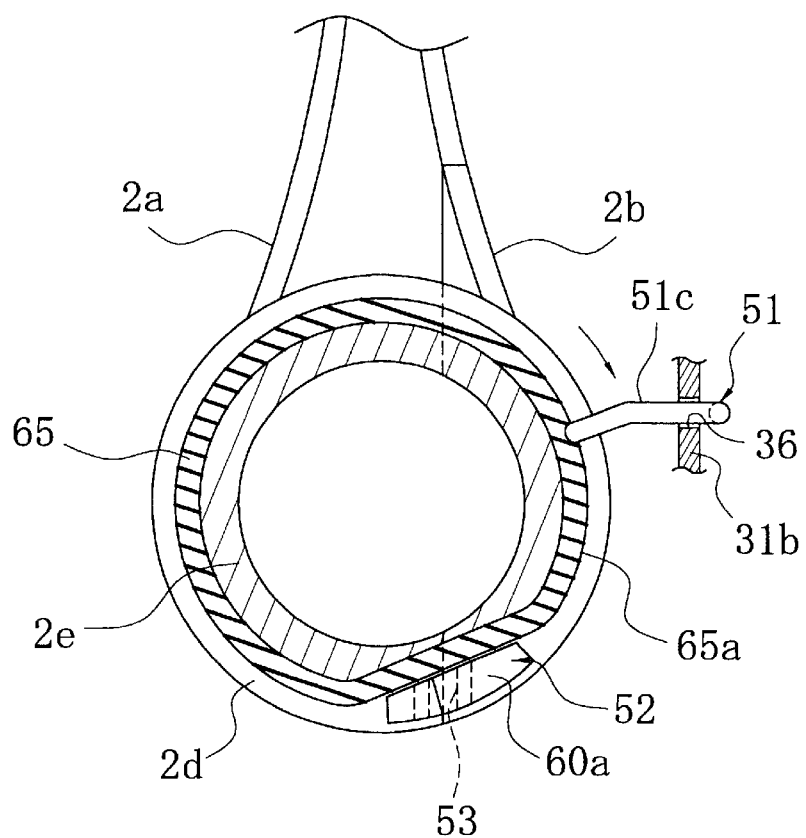
FIG. 5 is an elevational view of a section of the reel body, illustrating the bail tripping mechanism.

The reel body 2a is made, for example, of a magnesium alloy, and is formed in one piece with a T-shaped rod attachment leg 2c extending horizontally at the top of the reel body 2a. As shown in FIG. 2, the space in the reel body 2a accommodates a rotor driving mechanism 5 transmitting the rotation of the handle 1 to rotate the rotor 3, and an oscillation mechanism 6 for winding up the fishing line uniformly by shifting the spool 4 back and forth. A circular flange portion 2d and a cylindrical portion 2e are formed on the front of the reel body 2*a* and the lid member 2*b*. The cylindrical portion 2*e* is open to the front and its diameter is smaller than that of the flange portion 2*d*. As shown in FIG. 5, the cross section of the cylindrical portion 2*e* is D-shaped, like a dented circle.

Figure 6:
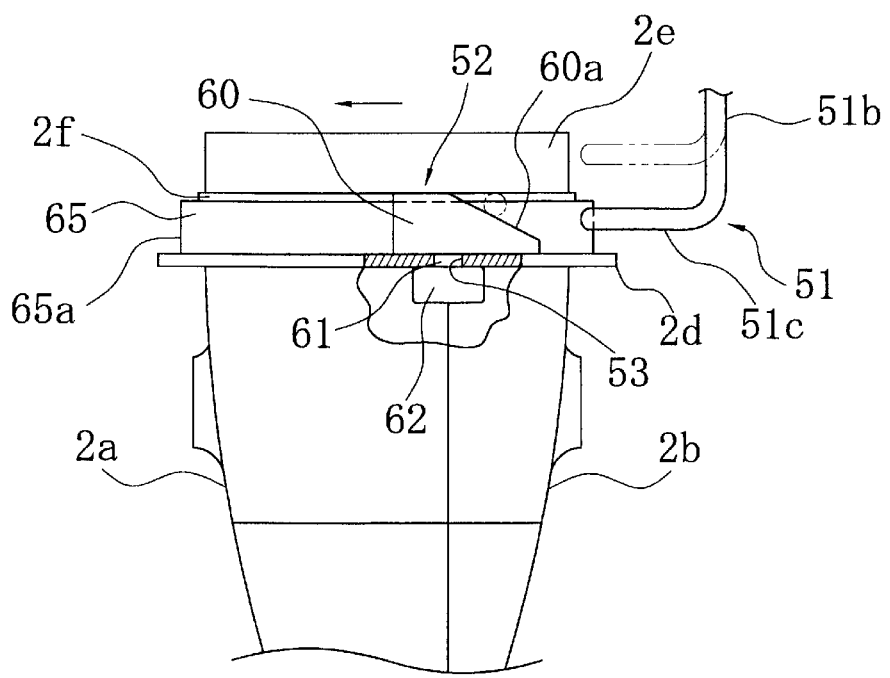
FIG. 6 is a partial underside view of the reel body, illustrating the bail tripping mechanism.

The lid member 2*b* is made, for example, of a magnesium alloy, and screwed at three locations to the reel body 2*a*. As shown in FIGS. 5 and 6, a switching member 52 is mounted detachably to the flange portion 2*d* at the portion where the reel body 2*a* and the lid member 2*b* can be taken apart.

As shown in FIG. 2, the rotor driving mechanism 5 includes a handle shaft 10, a face gear 11 and a pinion gear 12. The face gear 11 rotates together with the handle shaft 10, on which the handle 1 is mounted non-rotatively. The pinion gear 12 meshes with the face gear 11. The pinion gear 12 is tubular. Its front portion 12*a* penetrates the center of the rotor 3, and is fixed with a nut 13 to the rotor 3. The middle and the rear end (with respect to the axial direction) of the pinion gear 12 are rotatively supported by bearings 14*a* and 14*b* in the reel body 2.

The oscillating mechanism 6 shifts the spool 4 back and forth, shifting back and forth the spool shaft 15 to which the center of the spool 4 is coupled via a drag mechanism 71.

Rotor Configuration

As shown in FIG. 2, the rotor 3 includes a rotor unit 16, a bail arm 17, and a bail tripping mechanism 18. The bail arm 17 is disposed to the front of the rotor unit 16 and is pivotable between a line-releasing position and a line-winding position. The bail tripping mechanism 18 is mounted to the rotor unit 16 and is for returning the bail arm 17 into the line-winding position.

The rotor unit 16 includes a cylindrical portion 30, a first rotor arm 31 and a second rotor arm 32. The cylindrical portion 30 is attached to the reel body 2*a* and can rotate freely around the spool axis 15. The first rotor arm 31 and the second rotor arm 32 are arranged in opposition to one another on the sides of the cylindrical portion 30. The cylindrical portion 30, the first rotor arm 31 and the second rotor arm 32 can be made, for example, of an aluminum alloy, and are formed in one piece.

A front wall 33 is formed at the front of the cylindrical portion 30, and a boss portion 33 is formed in the center of this front wall 33. A through hole is formed in the center of the boss portion 33, and the front end 12*a* of the pinion gear and the spool shaft 15 are passed through this through hole. The nut 13 is provided to attach the rotor 3 to the front of the front wall 33.

Figure 3A:
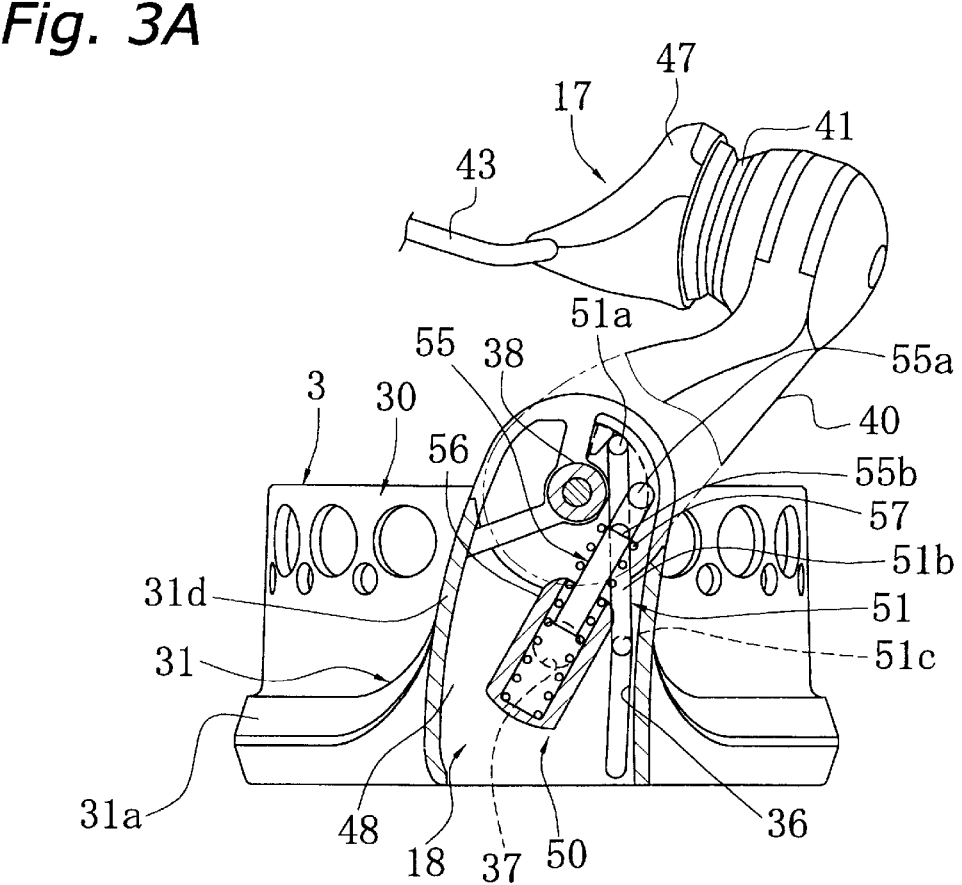
FIGS. 3A and 3B is an overhead oblique view of a first rotor arm with its cover removed, on the spinning reel rotor.
Figure 3B:
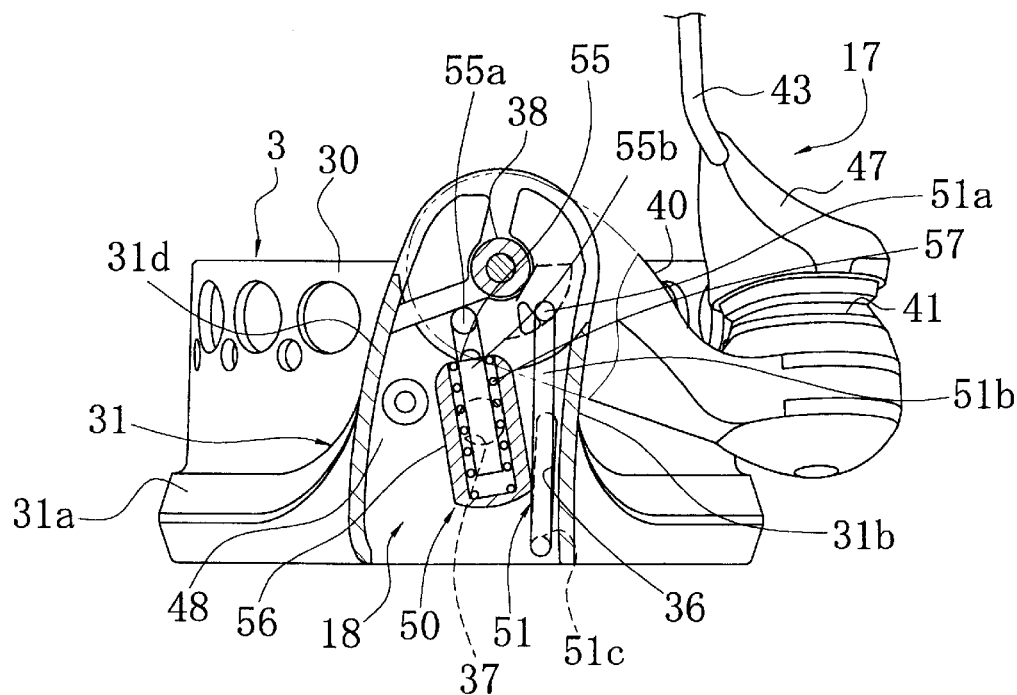
Figure 4:
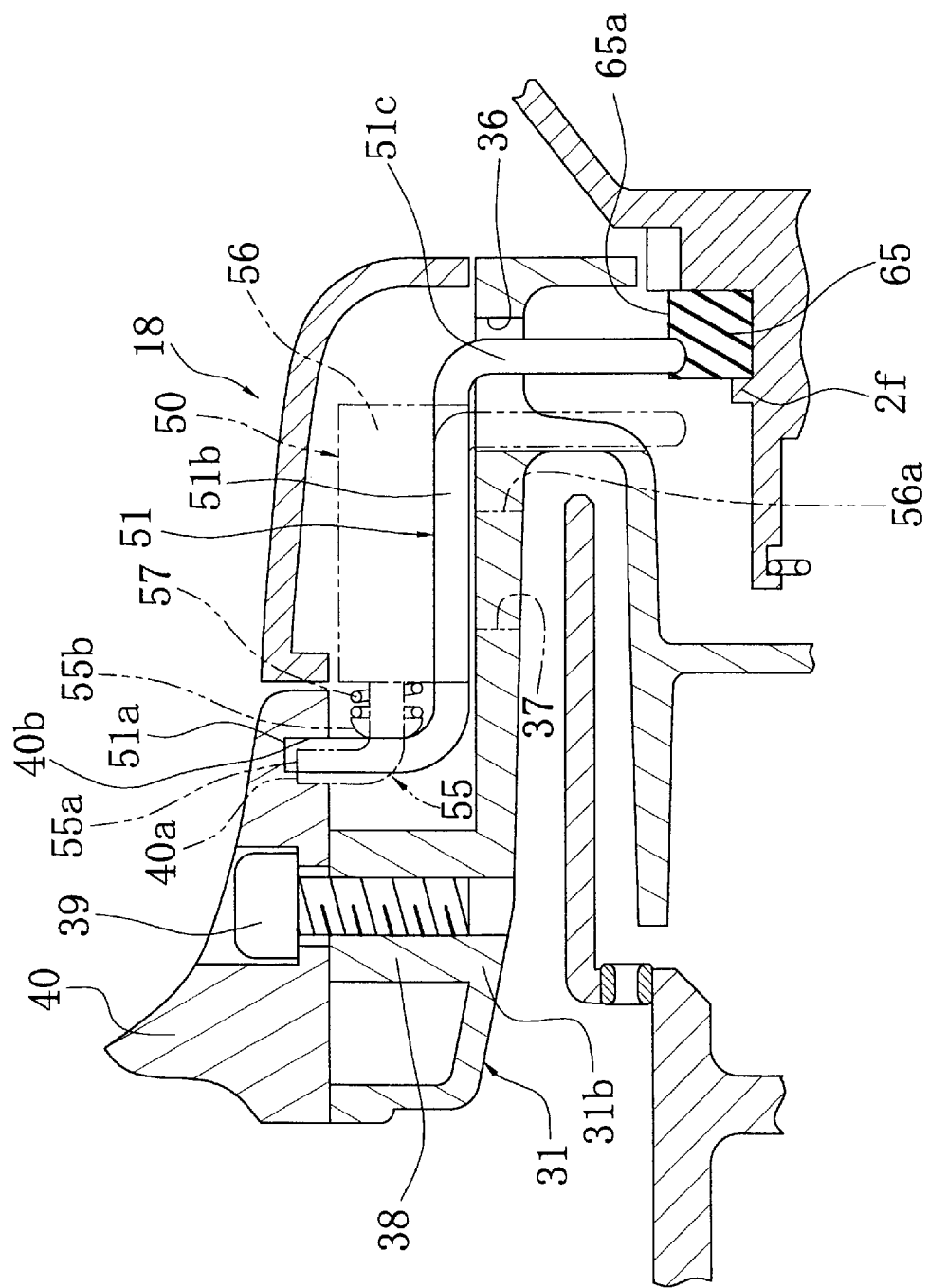
FIG. 4 is an enlarged fragmentary sectional view of the first rotor arm.

As shown in FIGS. 2 to 4, the first and second rotor arms 31 and 32 respectively include first and second connection portions 31*a* and 32*a* arranged at a peripheral surface at the rear of the cylindrical portion 30, first and second arm portions 31*b* and 32*b* curving out and extending frontward from the first and second connection portions 31*a* and 32*a*, and first and second cover members 31*c* and 32*c* covering the outer portions of both the two connection portions 31*a* and 32*a* and the two arm portions 31*b* and 32*b*. The first and second connection portions 31*a* and 32*a* are formed in smooth circumferential continuation of the cylindrical portion 30.

The first and second arm portions 31*b* and 32*b* are formed in smooth continuation of the first and second connection portions 31*a* and 32*a*, and extend frontward, keeping a certain distance to the cylindrical portion 30. The first and second arm portions 31*b* and 32*b* form a smooth curve from their tips to the portion where they are connected to the cylindrical portion 30. Apertures 31*d* and 32*d* are provided in outward portions of both the two connection portions 31*a* and 31*b* and the two arm portions 31*b* and 32*b*, and the first and second cover member 31*c* and 32*c* close the apertures 31*d* and 32*d* from outside. An accommodation space 48 is formed between the first cover member 31*c*, the first connection portion 31*a* and the first arm portion 31*b*.

A first bail support member 40 is mounted pivotably to an outer side of the first rotor arm 31*b*. As shown in FIG. 4, the first arm portion 31*b* is provided with a long hole 36 and a mounting hole 37 for mounting the bail tripping mechanism 18, and with a threaded boss portion 38 for mounting the first bail support member 40.

The second bail support member 42 is mounted pivotably to the inner tip of the second rotor arm 32*b*.

The first bail support member 40 is attached with an threaded attachment pin 39 to the first rotor arm 31*b* at the front end of the first rotor arm 31*b*. The attachment pin 39 is made of a bolt with a hexagonal hole and smooth edges, such that the fishing line does not get caught at its screw head.

As shown in FIG. 3, a line roller 41 for guiding fishing line to the spool 4, and a fixed shaft cover 47 are fixed to the front of the first bail support member 40, with the line roller 41 being arranged between the first bail support member 40 and the fixed shaft cover 47. The line roller 41 is mounted rotatively to the front end of the first bail support member 40. The fixed shaft cover 47 is shaped like a deformed cone with a sharpened tip. A bail 43, made by bending a wire into U-shape, is fixed between the tip of the fixed shaft cover 47 and the second bail support member 42. The first and second bail support members 40 and 42, the line roller 41, the bail 43, and the fixed shaft cover 47 constitute the bail arm 17, which guides the fishing line to the spool 4. The bail arm 17 can be pivoted between a line-winding position shown in FIG. 3A and, tripping it over from the line-winding position, a line-releasing position shown in FIG. 3B.

Bail Tripping Mechanism Configuration

The bail tripping mechanism 18 is disposed in the accommodation space 48. When the rotor 3 is rotated, the bail tripping mechanism 18 restores the bail arm 17 from the line-release position to the line-guiding position. At the same time, the bail tripping mechanism 18 retains the bail arm 17 as it is in either posture.

As shown in FIGS. 3 to 6, the bail tripping mechanism 18 includes a toggle spring mechanism 50, a shifting member 51, and a switching member 52. The toggle spring mechanism 50 is disposed within the accommodation space 48 and mounted pivotably to the first arm portion 31*b*. The shifting member 51 is also disposed in the accommodation space 48 and can be shifted back and forth. The switching member 52 is mounted detachably on the flange portion 2*d*, such that it can contact the shifting member 51.

As shown in FIG. 3, the toggle spring mechanism 50 is arranged inside the first rotor arm 31, and can assume a first position, in which the bail arm 17 is in line-winding position, and a second position, in which the bail arm 17 is in line-releasing position. The toggle spring mechanism 50 serves as a mechanism for holding the bail arm 17 in line-winding position or in line-releasing position. The toggle spring mechanism 50 includes a rod 55, a guide member 56, and a coil spring 57. One end of the rod 55 is interlocked with the first bail support member 40, and the other end extends along the first arm portion 31*b*. The rod 55 is fitted allowing it to advance/retreat into the guide member 56, the mid-portion of which meanwhile is pivotably attached to the first arm portion 31*b*. The coil spring 57 urges the rod 55 advancing outward the guide member 56.

As shown in FIG. 4, the front end portion 55*a* of the rod 55 is bent towards the outer peripheral side, and is engaged with an engagement hole 40a formed in the first bail support member 40. A spring-interlocking protrusion 55b is formed circumferentially on the rod 55.

The guide member 56 is a polygonal tube provided with a bottom and open to the front. At a center portion in axial direction, the guide member 56 is provided with a protruding pivot shaft 56a engaging the mounting hole 37. The pivot shaft 56a is oriented in radial direction of the rotor 3 and the guide member 56 is attached to the first rotor arm 31, pivotably around the pivot shaft 56a.

The toggle spring mechanism 50 is arranged such that the locations at which the rod 55 is engaged with the first bail support member 40 in the line-winding position and the line-releasing position are located away from the line connecting the axis of the pivot shaft 56a with the pivot axis of the first bail support member 40. Thus, the toggle spring mechanism 50 can toggle the bail arm 17 between these two positions, and is able to provide a bias for keeping both positions.

The shifting member 51 is a wire made of metal, such as stainless steel, and its two ends are bent to 90° angles pointing into different directions. The shifting member 51, can be shifted in the first arm portion 31b substantially horizontally between a distal position shown in FIG. 3A and a contact position shown in FIG. 3B. As shown in FIGS. 3 to 6, the front end portion 51a of the shifting member 51 is bent to the outside and engaged with the engagement hole 40b formed in the first bail support member 40. The middle portion 51b extends along the first arm portion 31b, inward in radial direction with respect to the rod 55. The rear end portion 51c of the shifting member 51 is bent to the inside, and then further towards the center (rotation axis) of the rotor 3. Bending the rear end portion 51c like this towards the center of the rotor 3, the transmission of power becomes smoother, when the switching member 51 contacts and presses against it. The rear end portion 51c reaches through the long hole 36 to a position on the inside where it overlaps slightly with the front surface of a braking member 65 mounted to the base of the cylindrical portion 2e. The end surface of the rear end portion 51c is slightly rounded. The width of the long hole 36 is roughly the same as the diameter of the shifting member 51. Therefore, the shifting member 51 shifts back and forth along the slot 36 in cooperation with pivoting of the bail arm 17.

When the bail arm 17 is in the line-releasing posture, the interlocking end of the shifting member 51 is positioned further line-winding posture-ward than a line segment joining the rear end portion 51c and the pivot center of the bail arm 17. That is, the shifting member 51 is arranged such that in both the retreat position and the contact position, the location where it interlocks with the first bail support member 40 is present in the same bearing from a line segment joining the axis of the rear end portion 51c (FIG. 3B) when in the contact position and the pivot axis of the first bail support member 40. Thus, when the rear end portion 51c of the shifting member 51 is pressed by the switching member 52, the first bail support member 40 is brought back into the line-winding posture. When in the contact position, the end face of the rear portion 51c, depth-ward from the front-end face of the braking member 65 digs inward into it somewhat from its circumferential face. Therefore, even when the amount by which the shifting member 51 shifts slightly fluctuates, the same braking force is always gained.

The purpose of the braking member 65 is to brake the rotation of the rotor 3 when the bail arm 17 is in the line-releasing position. The braking member 65 is an elastic ring with rectangular cross section made of a synthetic rubber, such as styrene-butadiene rubber (SBR), acrylonitrile-butadiene rubber, butadiene rubber, isoprene rubber, chloroprene rubber, silicone rubber or urethane rubber. The outer peripheral surface of the braking member 65 is provided with an even peripheral braking surface 65a, except at the portion evading the switching member 52. The braking member 65 is mounted at the base of the cylindrical portion 2e with the D-shaped cross section. The peripheral surface of the cylindrical member 2e is provided with an annular protrusion 2f, at a certain distance from the flange portion 2d, and the braking member 65 is disposed between the flange portion 2d and the annular protrusion 2f, contacting both.

The switching member 52 is made of a synthetic resin, such as nylon 66 or polyacetal, and, as shown in FIGS. 5 and 6, it is mounted detachably on the flange 2d at the portion where the reel body 2a and the lid member 2b can be taken apart. The portion where the reel body 2a and the lid member 2b can be taken apart is provided with a rectangular cut-out 53. The switching member 52 includes a cam portion 60 having an incline surface 60a, and a neck portion 61 and a brim portion 62, formed in one piece with the cam portion 60. The incline surface 60a is an oblique face whose downstream side in the fishing line take-up direction of the rotor 3 (indicated by the arrow in FIG. 6) protrudes forward toward the rotor 3 than the upstream side. The size of the neck portion 61 is such that the neck portion can be fitted into the cut-out 53, and the gap between the cam portion 60 and the brim portion 62 is approximately the same as the wall thickness of the flange portion 2d. The brim portion 62 has a larger cross-section than the neck portion 61, and contacts the back of the flange portion 2d.

When the lid member 2b is attached to the reel body 2a, the switching member 52 can be fixed to the reel body 2a simply by fitting the neck portion 61 into the cut-out 53 on the side of the reel body 2a and fastening the lid 2b on the reel body 2a with screws. Thus, the switching member 52 can be fastened in a straightforward manner without other parts for fastening the switching member 52. Furthermore, even though the reel body 2 is made of a magnesium alloy susceptible to corrosion, the switching member 52 contacting the shifting member 51 is provided separately from the reel body 2, so that the reel body 2 is not damaged when the bail arm 17 is tripped over. Therefore, corrosion due to such damage can be prevented. Furthermore, the switching member 52 mounted on the reel body 2 is made of an insulating synthetic resin, so that the reel body 2 is not subject to galvanic corrosion even though the switching member 52 contacts the reel body 2.

The toggle spring mechanism 50 thus configured is capable of assuming a first position shown in FIG. 3A and a second position shown in FIG. 3B. The first position corresponds to the line-winding posture of the bail arm 17, and the second position corresponds to the line-releasing posture of the bail arm 17. Furthermore, the shifting member 51, its rear end portion 51c guided by the slot 36, reciprocates into the retreat position shown in FIG. 3A and into the contact position shown in FIG. 3B. The retreat position corresponds to the line-winding posture, whereas the contact position corresponds to the line-releasing posture. In the contact position, the end face of the rear end portion 51c of the shifting member 51 contacts the braking surface 65a such that it is slightly compressed depth-ward from the front-end face of the braking member 65. Therefore, even if the shifting position, i.e. the contact position, of the shifting member 51 fluctuates in the axial direction the braking force does not fluctuate. Further, in the contact position, when the rotor 3 is rotated in the direction taking up line, the peripheral surface of the rear end portion 51c of the shifting member 51 contacts the incline surface 60a of the switching member 52, and the shifting member 51 is pressed forward, toward the retreat position.

As shown in FIG. 2, a reverse rotation check mechanism 70 for blocking and releasing reverse rotation of the rotor 3 is provided inside the cylindrical portion 30 of the rotor 3. This reverse rotation check mechanism 70 has a roller-type one-way clutch 51 and blocks or releases the reverse rotation of rotor 3 by switching the one-way clutch 51 between an operating state and a non-operating state.

The spool 4 is arranged between the first rotor arm 31 and the second rotor arm 32 of the rotor 3, and is disposed at the front end of the spool shaft 15 with the drag mechanism 71 interposed between the spool shaft 15 and the spool 4. The spool 4 includes a bobbin trunk portion 4a for winding fishing line around its circumference, a skirt portion 4b formed in one piece with the rear of the bobbin trunk portion 4a, and a flange portion 4c formed in one piece with the front of the bobbin trunk portion 4a.

Reel Function and Operation

When casting, the reverse rotation check mechanism 70 blocks reverse rotation of the rotor 3, and the bail arm 17 trips into line-releasing position. Tripping the bail arm 17 into the line-releasing position causes the first bail support member 40 and the second bail support member 42 to tumble over backwards, so that the bail tripping mechanism 18 assumes the second position shown in FIG. 3B. When the bail arm 17 has tumbled into the line-releasing position, fishing line can reeled out from easily from the spool 4.

When pivoting from this line-winding position to the line-releasing position, the rotation of the first bail support member 40 causes the rod 55 in the toggle spring mechanism 50 to pivot in anti-clockwise direction in FIG. 3A while retreating gradually, thereby assuming the second position shown in FIG. 3B. In this situation, the rod 55 retreats until it crosses the dead point. When crossing the dead point, the spring force of the coil spring 57 pushes the rod 55 out, whereby the bail arm 17 switches to the line-releasing position, which is held by the spring force.

As the bail arm 17 pivots into the line-releasing position, the shifting member 51 shifts from the distal position to the contact position, and the end surface of the rear end portion 51c of the shifting member 51 elastically contacts the braking surface 65a of the braking member 65, slightly indenting it. This brakes the rotor 3 and holds its rotational orientation. In this situation, the end surface of the rear end portion 51c of the shifting member 51 elastically contacts the braking surface 65a of the braking member 65, slightly indenting it, so that even when the contact position of the shifting member 51 is displaced in axial direction, the shifting member 51 still remains in a contact position, and the braking force stays the same. The shifting member 51 elastically contacts the braking member 65 and brakes the rotor 3 only by friction, so that the rotational orientation of the rotor 3 can be easily adjusted by turning it by hand or with the handle 1. This means, the rotational orientation is maintained by the frictional force braking the rotor 3, so that the rotor 3 does not rotate when the bail arm 17 is in the line-releasing position. This counters the problem that the rotor 3 suddenly starts to rotate when casting or feathering. Also, since the rotor 3 is braked by friction only, it is easy to adjust its rotational orientation by applying a force to the rotor 3.

In this situation, the fishing rod is cast while holding fishing line with the index finger of the hand with which the fishing rod is held. Thus, fishing line is released with high momentum due to the weight of the tackle.

After the casting, when the handle 1 is turned, for example with the left hand, in the direction taking up line while the bail arm 17 is still in the line-releasing position, the rotor driving mechanism 5 rotates the rotor 3 in the direction taking up line. When the rotor 3 rotates in the direction taking up line, the bail tripping mechanism 18 restores the bail arm 17 into the line-winding position.

To be more specific, in FIGS. 5 and 6, the shifting member 51 turns clockwise (in arrow direction) together with the rotor 3. The peripheral surface of the rear end portion 51c of the shifting member 51 abuts against the oblique surface 60a of the switching member 52 fixed to the reel body 2. This pushes the shifting member 51 forward, switching it to the distal position indicated by the phantom line in FIG. 6, and pivoting the first bail support member 40 into the line-winding position. Thus, the guide member 56 of the toggle spring mechanism 50 pivots from the second position shown in FIG. 3B toward the first position shown in FIG. 3A. Then, as the dead point is crossed, the spring force of the coil spring 57 pushes the rod 55 out, switching the bail arm 17 to the line-guiding position, and this position is held by the spring force. When the bail arm 17 is restored to the line-guiding position, the first bail support member 40 and the second bail support member 42 both point to the front, as shown in FIGS. 1 and 2. When the bail arm 17 has returned to the line-guiding position, the fishing line is guided to the spool 4 by the bail arm 17, and wound around the spool 4.

Figure 7A:
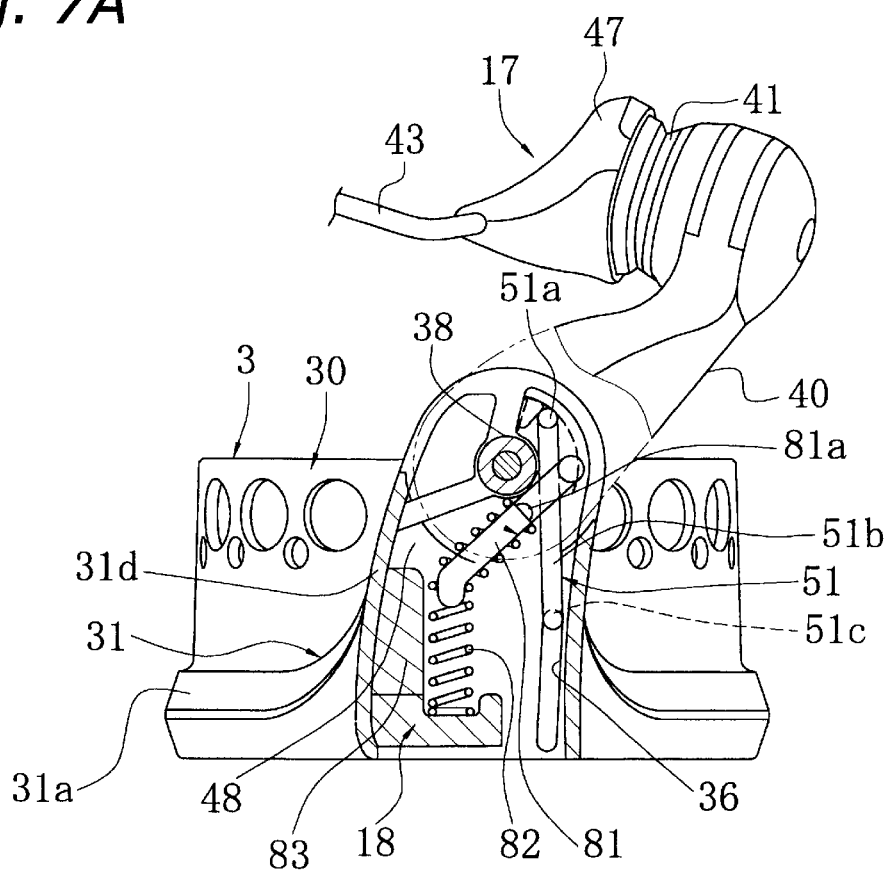
FIGS. 7A and 7B are views corresponding to FIGS. 3A and 3B, of another embodiment of the present invention.
Figure 7B:
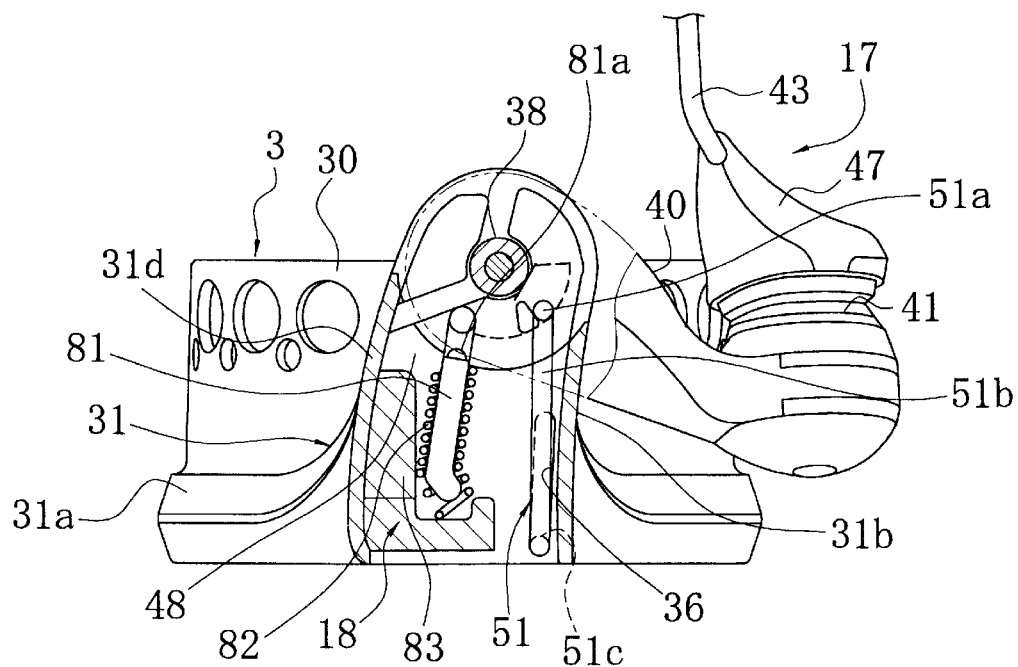

Other Embodiments (a) In the preceding embodiment, the toggle spring mechanism 50 was made of a rod 55, a guide member 56, and a coil spring 57, but as shown in FIGS. 7A and 7B, it is also possible to use a toggle spring mechanism 80 made of a rod 81 and a coil spring 82 only.

The front end of the rod 81 of the toggle spring mechanism 80 is engaged with the first bail support member 40, and its rear end is slightly curved. The rod 81 is provided with a spring engaging portion 81a engaging with a front end of the coil spring 82. The coil spring 82 contacts a guiding portion 83 formed in the arm portion 31a, by which it is guided. Thus, the present invention can also be applied to a bail tripping mechanism with a toggle spring mechanism 80 of this configuration.

(b) In the above-described embodiment, the braking member was made of synthetic rubber, but as long as it is elastic, it can also be made of metal, synthetic resin, wood (e.g. cork) or leather.

(c) In the above-described embodiment, the shifting member 51 was made of a metal wire, but the shifting member is not limited to this, and any configuration is suitable, as long as its rear end portion can shift back and forth and contact the braking surface of the braking member.

(d) In the above-described embodiment, the bail tripping mechanism 18 was disposed on the side of the first rotor arm 31, but it can also be disposed on the side of the second rotor arm 32.

Figure 8:
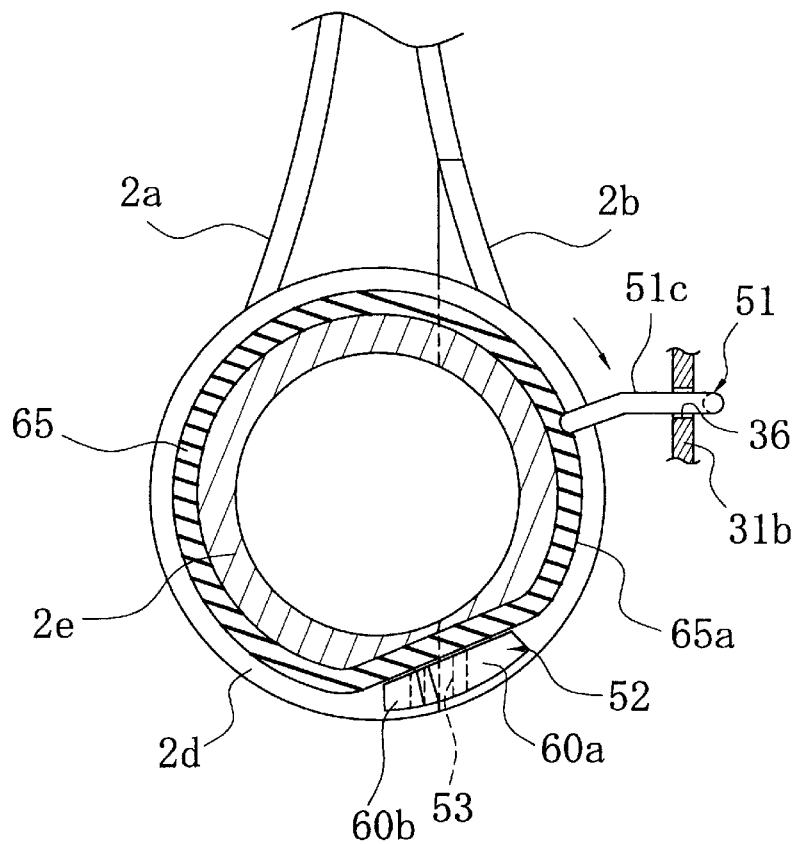
FIG. 8 is a view corresponding to FIG. 5, of another embodiment of the present invention.
Figure 9:
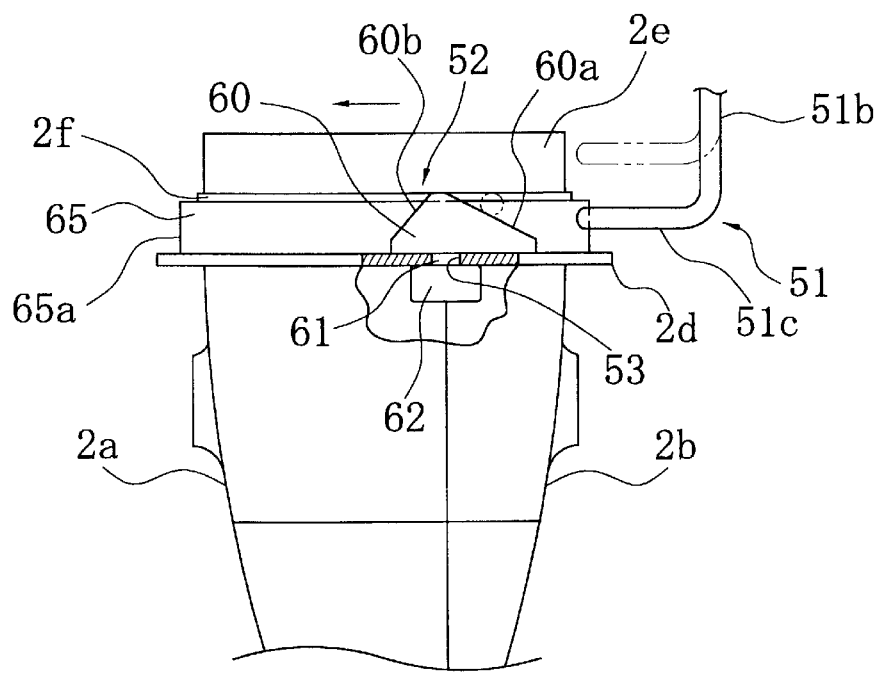
FIG. 9 is a view corresponding to FIG. 6, of another embodiment of the present invention.

(e) In the above-described embodiment, the oblique surface 60a of the switching member 52 is configured such that the leading side of the oblique surface 60a (with respect to a rotation of the rotor 3 in the direction taking up fishing line) protrudes further towards the rotor 3 than the trailing side, but as shown in FIGS. 8 and 9, it is also possible to provide, in addition to the oblique surface 60a, an oblique surface 60b, in which the leading side of the oblique surface 60a (with respect to a rotation of the rotor 3 in the direction taking up fishing line) protrudes less towards the rotor 3 than the trailing side. Forming such an additional oblique surface 60b, the switching member is provided with two oblique surfaces arranged at an angle. As a result, when the rotor 3 is forced to rotate in reverse (i.e. the direction rolling off line) with the bail arm 17 in the line-releasing position, and the shifting member 51 contacts the switching member 52, the shifting member 51 of the bail tripping mechanism 18 is guided smoothly by the oblique surface 60b of the switching member 52, and is less easily damaged. Such a switching member 52 having two oblique surfaces 60a and 60b can be applied not only to a switching member formed in one piece with the reel body 2, but also to a bail tripping mechanism not having a braking member.

(f) In the above-described embodiment, the rear end portion 51c of the shifting member 51 is guided in horizontal direction by the long hole 36, but it is also possible to arrange the long hole 36 not in completely horizontal direction, but at an angle, so that the rear end portion 51c is guided diagonally. If the rear end portion 51c is guided diagonally, then in the line-releasing position, the rear end portion 51c can be pointed toward the center of the rotor 3. If the rear end portion 51c points toward the center of the rotor 3, the rear end portion 51c does not have be bent further towards the center of the rotor 3.

(g) In the above-described embodiment, the tip of the rear end portion 51c of the shifting member 51 is rounded, but it is also possible to provide the rear end portion 51c with a bent tip contacting the braking surface 65 of the braking member 65.

According to the present invention, in the braking state, the second end of the shifting member contacts the braking surface provided on the peripheral surface of a braking member, so that when the position of the shifting member shifts (that is, when the second position shifts), the second end of the shifting member still contacts the braking member. Therefore, the rotor can be braked gently, regardless of the shifting of the shifting member.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning reel bail tripping device for returning a bail arm, fitted for pivoting between line-winding and line-releasing postures to a rotor attached rotatively to a spinning reel reel body, from the line-releasing posture to the line-winding posture in cooperation with rotation of the rotor in its line-winding direction, the bail tripping device comprising:

a shifting mechanism having a shifting member, a first end thereof turnably interlocked with the bail arm in a position neighboring its pivotal center, and a second end thereof provided on the rotor for shifting back and forth in cooperation with pivoting of the bail arm between a first position corresponding to the line-winding posture and a second position corresponding to the line-releasing posture, said shifting member second end when in the second position protruding toward a front portion of the reel body facing the rotor on the reel body;

a switching member provided on the reel body on its front, for contacting, when the rotor rotates in its line-winding direction, said shifting member protruding second end shifted into the second position, to shift said shifting member toward the first position; and a braking member provided on the reel body on its front, having a braking surface configured with a flat circumferential face on at least a portion of its outer periphery, for enabling said shifting member protruding second end shifted into the second position to contact said braking surface.

2. The spinning reel bail tripping device as set forth in claim 1, said shifting member being an element wherein said first end is bent to parallel the bail arm pivotal axis and be oriented adjacent its pivotal center, wherein said second end is bent toward the rotor rotational axis, and therein between is disposed paralleling the rotor rotational axis; wherein said first end is rotatively interlocked with the bail arm, and said second end is back-and-forth shiftably interlocked with the rotor.

3. The spinning reel bail tripping device as set forth in claim 1, wherein said shifting member second end is end-face rounded.

4. The spinning reel bail tripping device as set forth in claim 1, wherein said shifting mechanism includes a toggle spring mechanism, one end of which is turnably interlocked with the bail arm, for toggle-urging the bail arm into the line-winding posture and the line-releasing posture.

5. The spinning reel bail tripping device as set forth in claim 1, wherein said switching member has a first incline surface whose downstream side in the rotor line-winding rotational direction protrudes from the front of the reel body towards the rotor more than its upstream side.

6. The spinning reel bail tripping device as set forth in claim 5, wherein said switching member has a second incline surface formed continuous with the protruding portion of the first oblique surface and diminishing in protrusion amount heading from the protruding portion of the first oblique surface toward the downstream side in the rotor line-winding rotational direction.

7. The spinning reel bail tripping device as set forth in claim 1, wherein said braking member is made of a rectangular in section elastic body formed substantially into an annulus on the front of the reel body, to be contactable with said shifting member.

* * * * *